United States Patent
Mansour et al.

(10) Patent No.: US 11,711,673 B2
(45) Date of Patent: Jul. 25, 2023

(54) WIRELESS NETWORK ACCESS TO WIRELESS NETWORK SLICES OVER A COMMON RADIO CHANNEL

(71) Applicant: T-Mobile Innovations LLC, Overland Park, KS (US)

(72) Inventors: Nagi A. Mansour, Arlington, VA (US); Akin Ozozlu, McLean, VA (US); Noman Muzaffar Alam, Chantilly, VA (US); Sreten Cvetojevic, Vienna, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 200 days.

(21) Appl. No.: 17/354,021

(22) Filed: Jun. 22, 2021

(65) Prior Publication Data
US 2021/0314743 A1    Oct. 7, 2021

Related U.S. Application Data

(63) Continuation of application No. 16/665,737, filed on Oct. 28, 2019, now Pat. No. 11,076,270.

(51) Int. Cl.
*H04W 4/00* (2018.01)
*H04W 4/16* (2009.01)
(Continued)

(52) U.S. Cl.
CPC .............. *H04W 4/16* (2013.01); *H04W 4/40* (2018.02); *H04W 8/08* (2013.01); *H04W 48/18* (2013.01);
(Continued)

(58) Field of Classification Search
CPC ........... H04W 4/16; H04W 4/40; H04W 8/08; H04W 48/18; H04W 64/003;
(Continued)

(56) References Cited

U.S. PATENT DOCUMENTS

| 8,938,240 B2 | 1/2015 | Farhadi |
| 9,775,045 B2 | 9/2017 | Li et al. |

(Continued)

FOREIGN PATENT DOCUMENTS

| WO | 2017044151 A1 | 3/2017 |
| WO | 2019105095 A1 | 6/2019 |

OTHER PUBLICATIONS

Jie Zeng, et al.; "NO Stack: A Software-defined Framework for 5G Mobile Network"; 2016 23rd International Conference on Telecommunications (ICT); May 16, 2016; 5 pages; IEEE.

(Continued)

*Primary Examiner* — Marcos Batista

(57) ABSTRACT

A wireless communication network serves wireless user devices over a radio channel that is allocated into subchannels for wireless network slices. A wireless access node schedules resource blocks from the subchannels to the wireless user devices based on their wireless network slices. The wireless access node detects a subchannel has available resource blocks and other subchannels need the available resource blocks. The wireless access node schedules the available resource blocks to the wireless user devices that need the available resource blocks and that use a higher priority wireless network slice. The wireless access node wirelessly exchanges user data with the wireless user devices over the scheduled resource blocks and exchanges the user data with the wireless network slices. The wireless network slices exchanging at least some of the user data with external systems.

20 Claims, 6 Drawing Sheets

(51) Int. Cl.
- *H04W 4/40* (2018.01)
- *H04W 76/27* (2018.01)
- *H04W 8/08* (2009.01)
- *H04W 48/18* (2009.01)
- *H04W 64/00* (2009.01)
- *H04W 80/02* (2009.01)
- *H04W 80/10* (2009.01)
- *H04W 88/08* (2009.01)

(52) U.S. Cl.
CPC ......... *H04W 64/003* (2013.01); *H04W 76/27* (2018.02); *H04W 80/02* (2013.01); *H04W 80/10* (2013.01); *H04W 88/085* (2013.01)

(58) Field of Classification Search
CPC ..... H04W 76/27; H04W 80/02; H04W 80/10; H04W 88/085; H04W 72/52; Y02D 30/70
USPC .......................... 455/312–314; 370/329, 338
See application file for complete search history.

(56) References Cited

U.S. PATENT DOCUMENTS

| | | |
|---|---|---|
| 2016/0242147 A1 | 8/2016 | Tarlazzi et al. |
| 2017/0164349 A1 | 6/2017 | Zhu et al. |
| 2018/0013680 A1 | 1/2018 | Bull et al. |
| 2018/0167948 A1* | 6/2018 | Egner .................. H04W 76/16 |
| 2018/0176143 A1* | 6/2018 | Cui ........................ H04L 49/70 |
| 2018/0176900 A1 | 6/2018 | Rong et al. |
| 2018/0184415 A1 | 6/2018 | Rong et al. |
| 2018/0192445 A1 | 7/2018 | Jiang |
| 2018/0376407 A1 | 12/2018 | Myhre et al. |
| 2019/0230584 A1 | 7/2019 | Lou et al. |

OTHER PUBLICATIONS

Intel; "Network slicing support for RAN deployments with CU-CP and CU-UP separation"; 3GPP; Aug. 21, 2017; 4 pages; 3GPP TSG RAN WG3#97 R3-173805; Berlin, Germany.

* cited by examiner

WIRELESS NETWORK ACCESS TO WIRELESS NETWORK SLICES OVER A COMMON RADIO CHANNEL

RELATED CASES

This United States Patent Application is a continuation of U.S. patent application Ser. No. 16/665,737 that was filed on Oct. 28, 2019 and is entitled "WIRELESS NETWORK ACCESS TO WIRELESS NETWORK SLICES OVER A COMMON RADIO CHANNEL." U.S. patent application Ser. No. 16/665,737 is hereby incorporated by reference into this United States Patent Application.

TECHNICAL BACKGROUND

Wireless communication networks provide wireless data services to wireless user devices. Exemplary wireless data services include media-conferencing, internet-access, Low Power Wide Area Network (LP-WAN), Vehicle-to-X, social-networking, and the like. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Long Term Evolution (LTE) and Fifth Generation New Radio (5GNR).

The wireless signals propagate over radio bands. A typical radio band is hundreds of megahertz wide and is channelized. For example, a 100 megahertz band might be separated into five 20 megahertz channels. The different channels are often used to support frequency division between uplink/downlink or between adjacent network sectors. The typical radio channel supports many different wireless data services.

In addition to wireless access nodes, the wireless communication networks include other network elements like packet gateways and network controllers. These other network elements are often hosted by virtualized data centers. The virtualized data centers use a virtual layer to separate the network hardware from the network software. This separation enables convenient network element installation and scaling. The virtualization allows wireless communication networks to be separated into wireless network slices. A wireless network slice is a group of virtual network elements that interact to provide one or more wireless data services. Thus, a wireless network slice is also associated with one or more specific wireless data services.

Unfortunately, the interface between the wireless network slices and the radio channels is still primitive. Current channel configurations for wireless network slices waste spectral resources. Current wireless access nodes do not effectively utilize the radio channels to efficiently serve wireless user devices with wireless data service from the wireless network slices.

TECHNICAL OVERVIEW

A wireless communication network serves wireless user devices over a radio channel that is allocated into subchannels for wireless network slices. A wireless access node schedules resource blocks from the subchannels to the wireless user devices based on their wireless network slices. The wireless access node detects a subchannel has available resource blocks and other subchannels need the available resource blocks. The wireless access node schedules the available resource blocks to the wireless user devices that need the available resource blocks and that use a higher priority wireless network slice. The wireless access node wirelessly exchanges user data with the wireless user devices over the scheduled resource blocks and exchanges the user data with the wireless network slices. The wireless network slices exchanging at least some of the user data with external systems.

DETAILED DESCRIPTION

Figure 1:
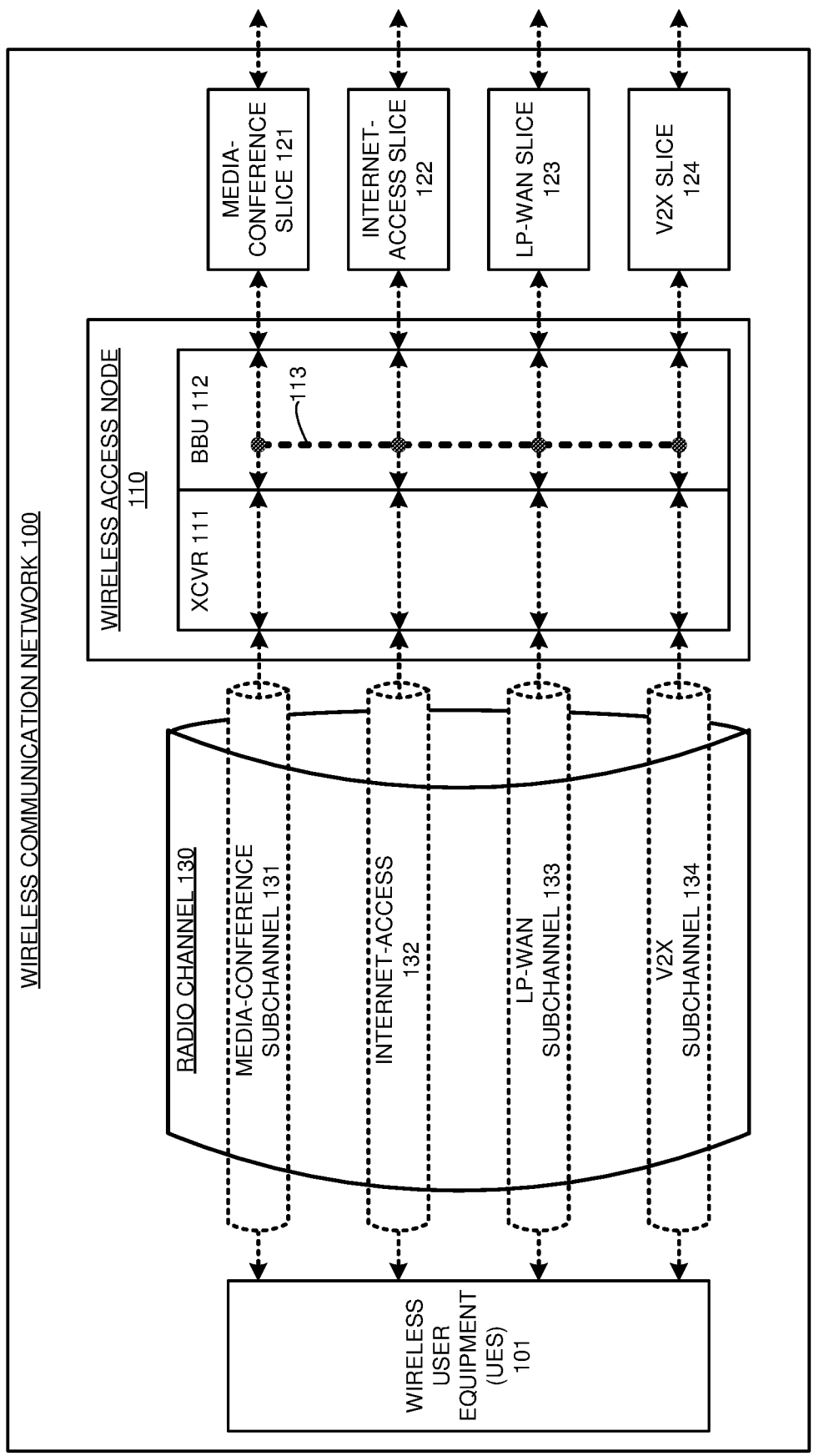
FIG. 1 illustrates a wireless access node to serve wireless User Equipment (UEs) over a common radio channel.

FIG. 1 illustrates wireless access node 110 to serve wireless User Equipment (UEs) 101 over common radio channel 130 in wireless communication network 100. Wireless communication network 100 comprises wireless User Equipment (UEs) 101, wireless access node 110, and wireless network slices 121-124. Wireless access node 110 comprises wireless transceiver (XCVR) 111 and Baseband Unit (BBU) 112. Wireless network slices 121-124 comprise media-conferencing slice 121, internet-access slice 122, Low-Power Wide Area Network (LP-WAN) slice 123, and Vehicle-to-X (V2X) slice 124.

Wireless UEs 101 are wirelessly linked to wireless XCVR 111 over radio channel 130. Radio channel 130 comprises media-conferencing subchannel 131, internet-access subchannel 132, LP-WAN subchannel 133, and V2X subchannel 134. Wireless communication network 100 is restricted for clarity and typically includes more UEs, radio channels, subchannels, access nodes, and slices than the amount shown.

UEs 101 have user circuitry and radio circuitry. The user circuitry interacts with humans and/or machines. The radio circuitry wirelessly communicates with XCVR 111 in wireless access node 110 over radio channel 130. UEs 101 might be phones, computers, robots, sensors, vehicles, or some other data appliance with wireless communication circuitry.

In wireless access node 110, XCVR 111 comprises antennas, modulators, amplifiers, filters, digital/analog interfaces, microprocessors, memory, software, transceivers, and bus circuitry. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memory comprises Random Access Memory (RAM), flash circuitry, disk drives, and/or the like. The memory stores software like operating systems and network applications. The microprocessors execute the operating systems and network applications to wirelessly exchange network signaling and user data with UEs 101 over subchannels 131-134 in radio channel 130. The microprocessors execute the operating systems and network applications to exchange the network signaling and user data with BBU 112 over fronthaul links.

In wireless access node 110, BBU 112 comprises microprocessors, memory, software, transceivers, and bus circuitry. The microprocessors comprise CPUs, GPUs, ASICs, and/or the like. The memory comprises RAM, flash circuitry, disk drives, and/or the like. The memory stores software like operating systems, network applications, and virtual components. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP), although other network applications could be used. The microprocessors execute the operating systems and network applications to exchange network signaling and user data with UEs 101 over XCVR 111 and radio channel 130. The microprocessors execute the operating systems and network applications to exchange network signaling and user data with network slices 121-124 over backhaul links.

Wireless network slices 121-124 comprise microprocessors, memory, software, transceivers, and bus connections. The microprocessors comprise CPUs, GPUs, ASICs, and/or the like. The memory comprises RAM, flash circuitry, disk drives, and/or the like. The memory stores software like operating systems, virtual components, and Virtual Network Functions (VNFs). Exemplary VNFs comprise: Access and Mobility Management Functions (AMFs), Session Management Functions (SMFs), User Plane Functions (UPFs), Policy Control Functions (PCFs), Authentication Server Functions (AUSFs), Unified Data Functions (UDMs), Application Functions (AFs), Internet Protocol Multimedia Subsystem (IMS), and/or some other type of networking software. In some examples, network slices 121-124 comprise one or more Network Function Virtualization Infrastructures (NFVIs).

Media-conferencing slice 121 authorizes and groups UEs 101 for media-conferences, and then distributes and/or media data for the media conferences among UEs 101. For example, four video-phones may engage in a live video-chat with one another over media-conference subchannel 131, wireless access node 110, and media-conferencing slice 121. In some examples, media-conferencing slice 121 comprises an IMS, AF, UPF, AMF, SMF, and PCF.

Internet-access slice 122 authorizes internet access and then exchanges internet data with the internet for UEs 101. For example, a laptop computer may interact with a search-engine and several web sites over internet-access subchannel 133, wireless access node 110, and internet-access slice 122. In some examples, internet-access slice 122 comprises an AUSF, UPF, AMF, SMF, and PCF.

LP-WAN slice 123 exchanges relatively small amounts of machine data for UEs 101 over low-power but long-range wireless messaging. For example, weather sensors may transfer atmospheric data to a national weather center over LP-WAN subchannel 133, wireless access node 110, and LP-WAN slice 123. In some examples, LP-WAN slice 123 comprises an AMF, AUSF, SMF, and UPF.

V2X slice 124 serves vehicles with wireless connectivity to various entities including controllers, monitors, and other vehicles. For example, two cars may exchange acceleration and velocity data over V2X subchannel 134, wireless access node 110, and V2X slice 124. In some examples, V2X slice 123 comprises an AMF, AUSF, SMF, PCF, and UPF.

UEs 101 and wireless access node 110 wirelessly exchange network signaling and user data over subchannels 131-134 in radio channel 130. Radio channel 130 may use radio frequencies in the low-band, mid-band, millimeter-wave band, and/or some other part of the wireless communication spectrum. Radio channel 130 may use Fifth Generation New Radio (5GNR), Institute of Electrical and Electronic Engineers (IEEE) 802.11 (WIFI), Long Term Evolution (LTE), LP-WAN, or some other wireless protocol. Various wireless protocols are described by IEEE, Internet Engineering Task Force, (IETF), and Third Generation Partnership Project (3GPP) publications among others. The fronthaul and backhaul links may use IEEE 802.3 (Ethernet), Time Division Multiplex (TDM), Data Over Cable System Interface Specification (DOCSIS), Synchronous Optical Network (SONET), LTE, 5GNR, WIFI, or some other data communication protocol.

In wireless access node 110, BBU 112 determines the size and placement of subchannels 131-134 within radio channel 130. The size may be indicated by channel percentage, resource block amount, and the like. The placement may be indicated by resource block numbers, subcarrier boundaries, and the like. BBU 112 determines the size and placement of subchannels 131-134 based on its geographic location, time-of-day, day-of-week, and day-of-year. The size and placement of subchannels 131-134 within radio channel 130 is typically based on historical usage data for that service, time, and location. Other wireless access nodes at different locations will individually determine their own subchannels from radio channel 130 in a similar manner.

In wireless access node 110, BBU 112 schedules media-conferencing resource blocks from media-conferencing subchannel 131 to exchange media-conferencing data. BBU 112 schedules internet-access resource blocks from Internet-access subchannel 132 to exchange Internet-access data. BBU 112 schedules LP-WAN resource blocks from LP-WAN subchannel 133 to exchange LP-WAN data. BBU 112 schedules V2X resource blocks from V2X subchannel 134 to exchange V2X data. BBU 112 then schedules any unscheduled resource blocks from subchannels 131-134 for any remaining media-conferencing data, Internet-access data, LP-WAN data, and V2X data. The allocation of the unscheduled resource blocks to the remaining unscheduled data may use a service priority, round-robin, random distribution, or some other allocation technique.

BBU 112 transfers information about unscheduled resource blocks in subchannels 131-134 over link 113. BBU 112 also transfers the additional media-conferencing data, internet-access data, LP-WAN data, and V2X data over link 113 when subsequently using the formerly unscheduled resource blocks. For example, BBU 112 may receive media-conferencing data from media-conferencing slice 121 and transfer the media-conferencing data over link 113, XCVR 111, and internet-access subchannel 132 for wireless delivery to UEs 101. In another example, BBU 112 may receive V2X data from UEs 101 over LP-WAN subchannel 134 and XCVR 111 and then transfer the V2X data over link 113 for delivery to V2X slice 124.

UEs 101 and XCVR 111 wirelessly exchange media-conferencing data, internet-access data, LP-WAN data, and V2X data over scheduled resource blocks. XCVR 111 and BBU 112 exchange the media-conferencing data, internet-access data, LP-WAN data, and V2X data over fronthaul links. BBU 112 and media-conferencing slice 121 exchange the media-conferencing data over backhaul links. BBU 112 and internet-access slice 122 exchange the internet-access data over backhaul links. BBU 112 and LP-WAN slice 123 exchange the LP-WAN data over backhaul links. BBU 112 and V2X slice 124 exchange the V2X data over backhaul links.

Advantageously, wireless communication network 100 effectively utilize radio channel 130 to efficiently serve wireless UEs 101 with network services from wireless network slices 121-124.

Figure 2:
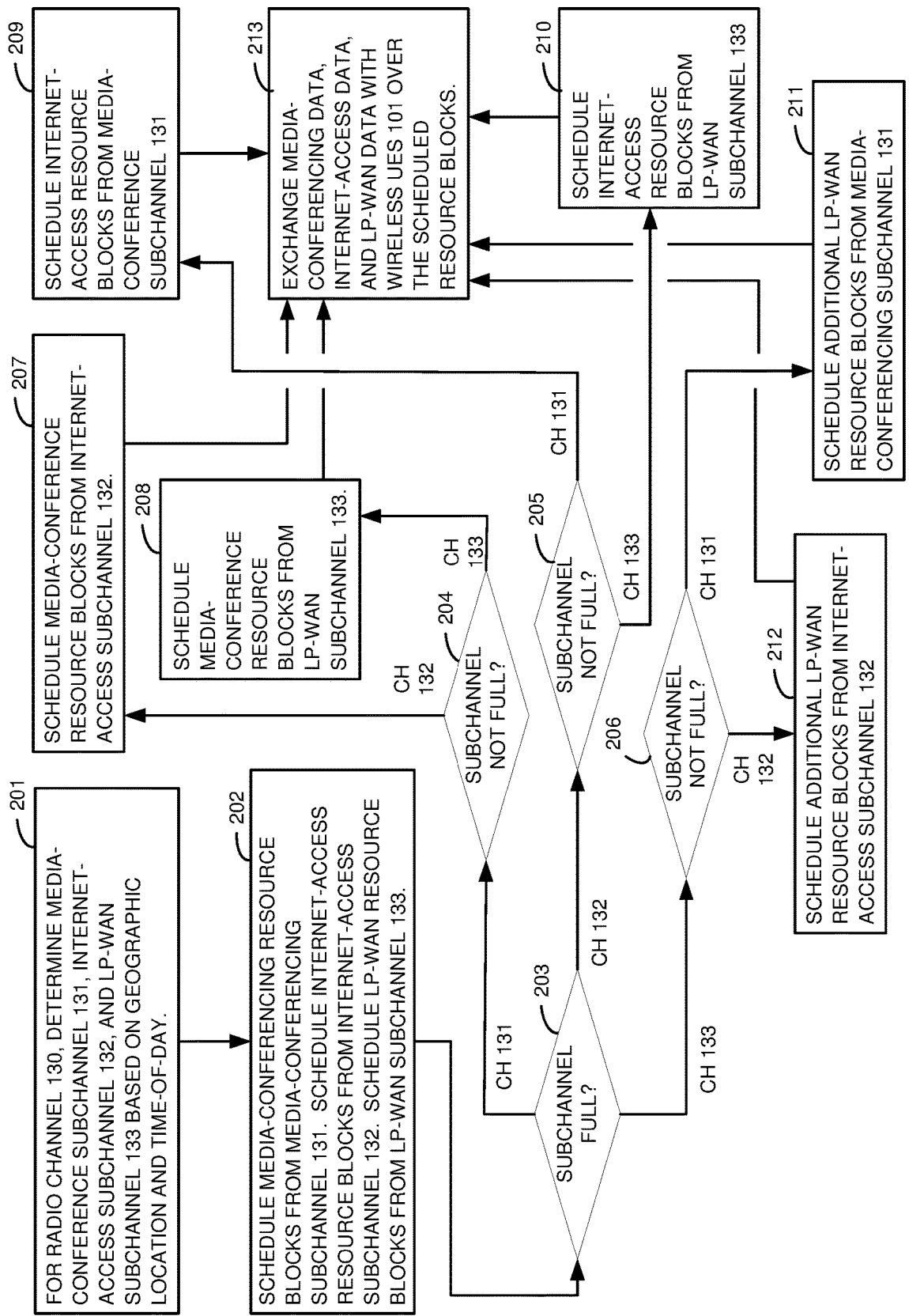
FIG. 2 illustrates the operation of the wireless access node to serve the wireless UEs over the common radio channel.

FIG. 2 illustrates the operation of wireless access node 110 to serve wireless UEs 101 over common radio channel 130. Wireless access node 110 determines subchannels 131-133 within radio channel 130 based on location and time-of-day (201). Subchannels 131-133 are specified by size and placement within radio channel 130. Wireless access node 110 schedules media-conferencing resource blocks from media-conferencing subchannel 131 to exchange media-conferencing data (202). Wireless access node 110 schedules internet-access resource blocks from internet-access subchannel 132 to exchange internet-access data (202). Wireless access node 110 schedules LP-WAN resource blocks from LP-WAN subchannel 133 to exchange LP-WAN data (202).

Wireless access node 110 identifies if any of subchannels 131-133 are full but have data remaining data for upload/download (203). Wireless access node 110 identifies any unscheduled resource blocks that are still available in subchannels 131-133 (204-206). When media-conferencing subchannel 131 is full (203) but internet-access subchannel 132 is not full (204), wireless access node 110 schedules media-conferencing data over internet-access subchannel 132 (207). When media-conferencing subchannel 131 is full (203) but LP-WAN subchannel 133 is not full (204), wireless access node 110 schedules media-conferencing data over LP-WAN subchannel 133 (208). When internet-access subchannel 132 is full (203) but media-conferencing subchannel 131 is not full (205), wireless access node 110 schedules internet-access data over media-conferencing subchannel 131 (209). When internet-access subchannel 132 is full (203) but LP-WAN subchannel 133 is not full (205), wireless access node 110 schedules internet-access data over LP-WAN subchannel 133 (210). When LP-WAN subchannel 133 is full (203) but media-conferencing subchannel 131 is not full (206), wireless access node 110 schedules LP-WAN data over media-conferencing subchannel 131 (211). When LP-WAN subchannel 133 is full (203) but internet-access subchannel 132 is not full (206), wireless access node 110 schedules LP-WAN data over internet-access subchannel 132 (212).

Wireless access node 110 wirelessly exchanges media-conferencing data, internet-access data, and LP-WAN data with UEs 101 over the scheduled resource blocks (213). Wireless access node 110 exchanges media-conferencing data with media-conferencing slice 121. Wireless access node 110 exchanges internet-access data with internet-access slice 122. Wireless access node 110 exchanges LP-WAN data with LP-WAN slice 123.

Figure 3:
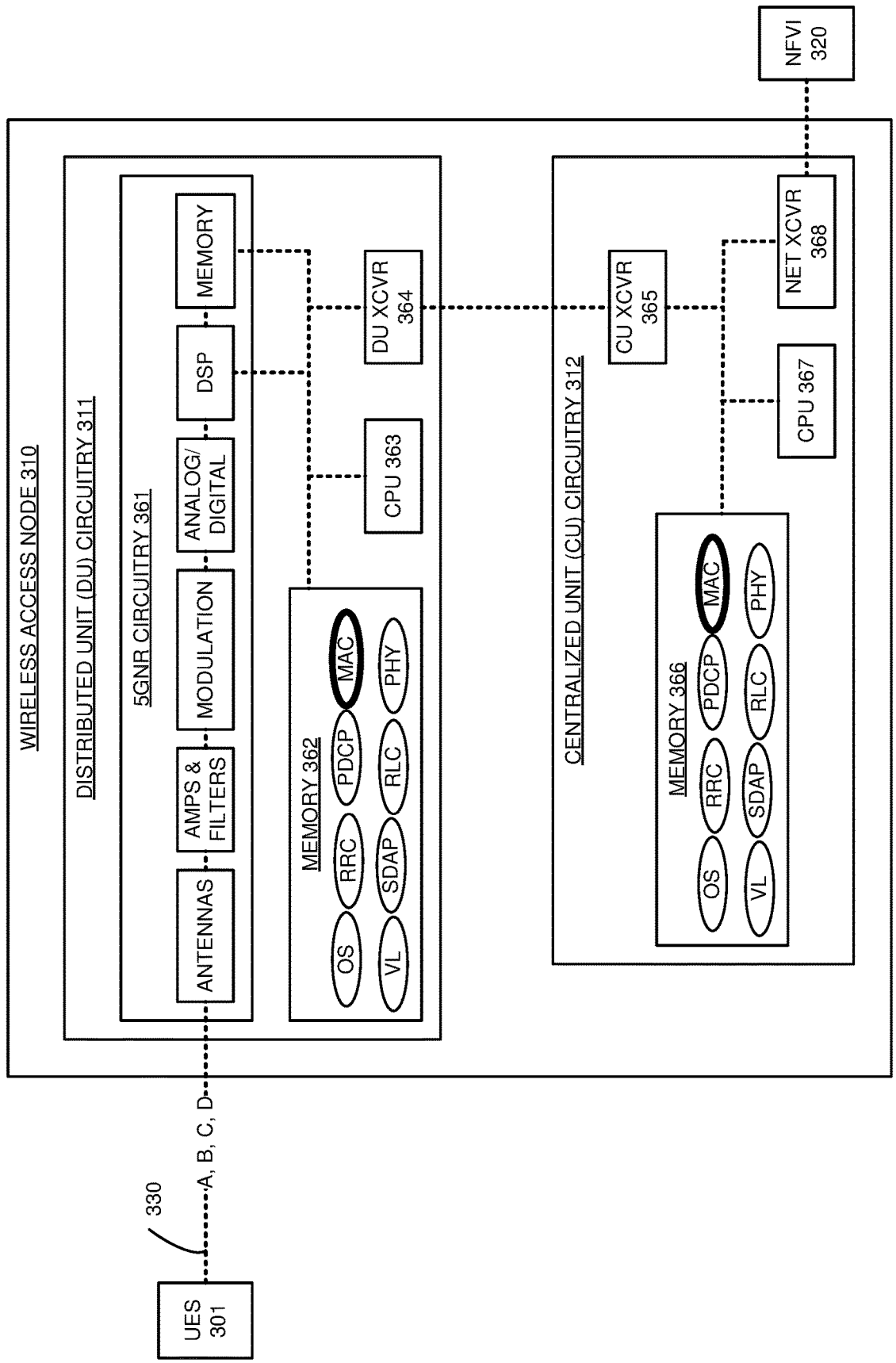
FIG. 3 illustrates a wireless access node to serve wireless User Equipment (UEs) over a common radio channel.

FIG. 3 illustrates wireless access node 310 to serve wireless User Equipment (UEs) 301 over common radio channel 330. Wireless access node 310 is an example of wireless access node 110, although node 110 may differ. Wireless access node 310 comprises Distributed Unit (DU) circuitry 311 and Centralized Unit (CU) circuitry 312. DU circuitry 711 comprises (Fifth Generation New Radio (5GNR) circuitry 361, memory 362, Central Processing Units (CPU) 363, and DU XCVR 364 that are coupled over bus circuitry. 5GNR circuitry 361 comprises antennas, amplifiers (AMPS), filters, modulation, analog-to-digital interfaces, Digital Signal Processors (DSP), and memory that are coupled over bus circuitry. CU circuitry 312 comprises CU XCVR 365, memory 366, CPU 367, and network XCVR 368 that are coupled over bus circuitry. UEs 301 are wirelessly coupled to the antennas in 5GNR circuitry 361 over 5GNR links in radio channel 330. DU XCVR 364 is coupled to CU XCVR over fronthaul links. Network XCVR 368 is coupled to Network Function Virtualization Infrastructure (NFVI) 320 over backhaul links.

In DU circuitry 311, memory 362 stores operating system (OS), virtual layer (VL), Physical Layer (PHY), Media Access Control (MAC), Radio Link Control (RLC), Packet Data Convergence Protocol (PDCP), Radio Resource Control (RRC), and Service Data Adaptation Protocol (SDAP). In CU circuitry 312, the memories store operating system, virtual layer, PHY, MAC, RLC, PDCP, RRC, and SDAP. The virtual layer comprises hypervisor modules, virtual switches, virtual machines, and/or the like.

CPU 367 in CU circuitry 312 executes some or all of the network applications (PHY, MAC, RLC, PDCP, RRC, and SDAP) to drive the exchange of user data and network signaling data between NFVI 320 and DU circuitry 311. CPU 363 in DU circuitry 311 executes some or all of the network applications to drive the transfer of user data and network signaling between CU circuitry 312 and UEs 301. The functionality split of the network applications between DU circuitry 311 and CU circuitry 312 may vary.

The RRC in circuitry 311-312 exchanges N2/N1 signaling with Access and Mobility Management Functions (AMFs) in NFVI 320. The RRC exchanges RRC/N1 signaling with UEs 301. The RRC processes uplink RRC signaling and downlink N2 signaling to generate new downlink RRC signaling and uplink N2 signaling. The SDAP in circuitry 311-312 exchanges N3 data with User Plane Functions (UPFs) in NFVI 320. The SDAP exchanges SDAP data with SDAPs in UEs 301. The SDAP interworks between the N3 data and the SDAP data.

The RRC exchanges the RRC/N1 signaling with the PDCP in Service Data Units (SDUs). The SDAP exchanges the SDAP data with the PDCP in SDUs. The PDCP maps between the SDUs and Protocol Data Units (PDUs). The PDCP exchanges the PDUs with the RLC. The RLC maps between the PDUs and MAC logical channels. The RLC exchanges the RRC/N1 and SDAP data with the MAC over the MAC logical channels. The MAC maps between the MAC logical channels and MAC transport channels. The MAC exchanges the RRC/N1 signaling and SDAP data with the PHY over the MAC transport channels. The PHY maps between the MAC transport channels and PHY transport channels. The PHY exchanges the RRC/N1 signaling and SDAP data with the PHYs in UEs 301 over PHY transport channels in radio channel 330.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/

Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In 5GNR circuitry 361, the antennas receive wireless 5GNR signals from UEs 301 that transport Uplink (UL) RRC/N1 signaling and SDAP data. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSP. The DSP recovers UL 5GNR symbols from the UL digital signals. In DU circuitry 311 and/or CU circuitry 312, the CPUs execute the network applications to process the UL 5GNR symbols and recover the UL RRC/N1 signaling and SDAP data. In DU circuitry 311 and/or CU circuitry 312, the CPUs execute the network applications to generate new UL N2/N1 signaling and new UL N3 data. In CU circuitry 312, network XCVR 368 transfers the new UL N2/N1 signaling and N3 data to NFVI 320.

In CU circuitry 312, network XCVR 368 receives Downlink (DL) N2/N1 signaling and N3 data from NFVI 320 and transfers the signaling and data to memory. In circuitry 421-422, CPU 363 and/or 367 executes the network applications to generate new DL RRC/N1 signaling and SDAP data. In circuitry 421-422, CPU 363 and/or 368 execute the network applications to process the new DL RRC/N1 signaling and SDAP data to generate DL 5GNR symbols that carry the DL RRC/N1 signaling and SDAP data. In DU circuitry 361, the DSP process the DL 5GNR symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals over radio channel 330 that transport the DL RRC/N1 signaling and SDAP data to UEs 301.

In wireless access node 310, the MAC determines the sizes and placements of subchannels A, B, C, and D within radio channel 330. The subchannel sizes may be indicated by channel percentage, resource block amount, and the like. The subchannel placements may be indicated by resource block numbers, subcarrier boundaries, and the like. The MAC determines the size and placement of the subchannels based on a data structure for the geographic location of node 310 that translates time-of-day, day-of-week, and day-of-year into the set of subchannels A, B, C, and D—including their size and placement within channel 330. For example, radio channel 330 may be 100 megahertz wide and have subchannels A, B, C, and D that each comprise 25% (25 megahertz) of the 100 megahertz channel. The placement of each subchannel could be specified by a pair of edge subcarriers for the channel.

In wireless access node 310, the MAC schedules resource blocks for service A from subchannel A. The MAC schedules resource blocks for service B from subchannel B. The MAC schedules resource blocks for service C from subchannel C. The MAC schedules resource blocks for service D from subchannel D. The MAC then schedules any unscheduled resource blocks from subchannels A, B, C, and D to carry any remaining data for services A, B, C, and D. The allocation of the unscheduled resource blocks to remaining data may use a service priority, round-robin, random distribution, or some other allocation process.

CU circuitry 312 and NFVI 320 exchange data for service A with a network slice for service A over backhaul links. CU circuitry 312 and NFVI 320 exchange data for service B with a network slice for service B over the backhaul links. CU circuitry 312 and NFVI 320 exchange data for service C with a network slice for service C over the backhaul links. CU circuitry 312 and NFVI 320 exchange data for service D with a network slice for service D over the backhaul links. CU circuitry 312 and DU circuitry 311 exchange the service data over the fronthaul links. DU circuitry 311 and UEs 301 wirelessly exchange the service data over the scheduled resource blocks in subchannels A, B, C, and D of radio channel 330.

Figure 4:
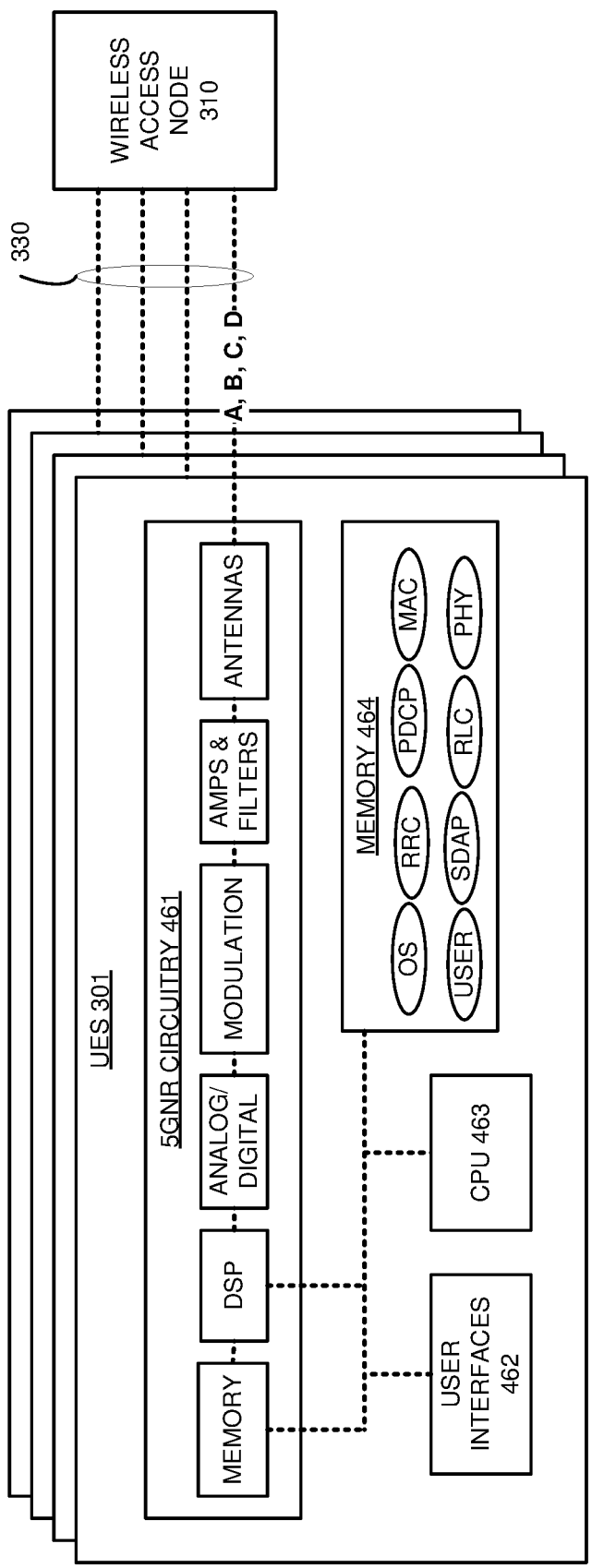
FIG. 4 illustrates a wireless UE that is served by the wireless access node over the common radio channel.

FIG. 4 illustrates wireless UEs 301 that are served by wireless access node 310 over radio channel 330. UEs 301 are an example of UEs 101, although UEs 101 may differ. On FIG. 4, the top one of UEs 301 is described below referred to as UE 301.

UE 301 comprises Fifth Generation New Radio (5GNR) circuitry 461, user interfaces 462, CPU 463, and memory 464 which are interconnected over bus circuitry. 5GNR circuitry 461 comprises antennas, amplifiers, filters, modulation, analog-to-digital interfaces, DSP, and memory that are coupled over bus circuitry. The antennas in UE 301 are coupled to wireless access node 310 over wireless links in subchannels A, B, C, and D of radio channel 330. User interfaces 462 comprise graphic displays, machine controllers, sensors, cameras, transceivers, and/or some other user components. Memory 464 stores an operating system, user applications, and network applications. The network applications comprise PHY, MAC, RLC, PDCP, RRC, and SDAP. CPU 463 executes the operating systems, user applications, and network applications to exchange RRC/N1 signaling and SDAP data with wireless access node 310 over 5GNR circuitry 461 and subchannels A, B, C, and D of radio channel 330.

The RRC exchanges user signaling with the user applications. The RRC processes the user signaling and DL RRC/N1 signaling to generate DL user signaling and UL RRC/N1 signaling. The SDAP exchanges user data with the user applications. The SDAP processes UL user data to generate uplink SDAP data and processes DL SDAP data to generate DL user data. The RRC exchanges the RRC/N1 signaling with the PDCP in SDUs. The SDAP exchanges the SDAP data with the PDCP in SDUs. The PDCP maps between the SDUs and PDUs. The PDCP exchanges the PDUs with the RLC. The RLC maps between the PDUs and MAC logical channels. The RLC exchanges the RRC/N1 and SDAP data with the MAC over the MAC logical channels. The MAC maps between the MAC logical channels and MAC transport channels. The MAC exchanges the RRC/N1 signaling and SDAP data with the PHY over the MAC transport channels. The PHY maps between the MAC transport channels and PHY transport channels. The PHY exchanges the RRC/N1 signaling and SDAP data with the PHY in wireless access node 310 over PHY transport channels in subchannels A, B, C, and D of radio channel 330.

In 5GNR circuitry 461, the antennas receive wireless signals from wireless access node 310 that transport DL RRC/N1 signaling and SDAP data. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSP. The DSP recovers DL symbols from the DL digital signals. The CPU executes the network applications to process the DL 5GNR symbols and recover the DL RRC/N1 signaling and SDAP data. CPU 463 executes the network applications to process the DL RRC/N1 signaling and SDAP data to generate DL user data and signaling for the user applications.

CPU 463 executes the network applications to process UL user data and signaling to generate UL RRC/N1 signaling and SDAP data. CPU 463 executes the network applications to process the UL RRC/N1 signaling and SDAP data to generate corresponding UL 5GNR symbols. The DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequencies. The amplifiers boost the modulated UL signals for the filters which attenuate unwanted out-of-band energy. The filters transfer the filtered UL signals through duplexers to the antennas. The electrical UL signals drive the antennas to emit corresponding wireless signals that transport the UL RRC/N1 signaling and SDAP data to wireless access node 310 over subchannels A, B, C, and D in radio channel 330.

In UE 301, the MAC receives instructions from the MAC in wireless access node 310 that indicate the sizes and placements of subchannels A, B, C, and D within radio channel 330. In UE 301, the MAC receives schedules of resource blocks over subchannels A, B, C, and D from the MAC in wireless access node 310. Per the schedules, 5GNR circuitry 461 and wireless access node 310 wirelessly exchange the data for services A, B, C, and D over the scheduled resource blocks in subchannels A, B, C, and D of radio channel 330. UE 301 exchanges the service data with the corresponding user applications.

Figure 5:
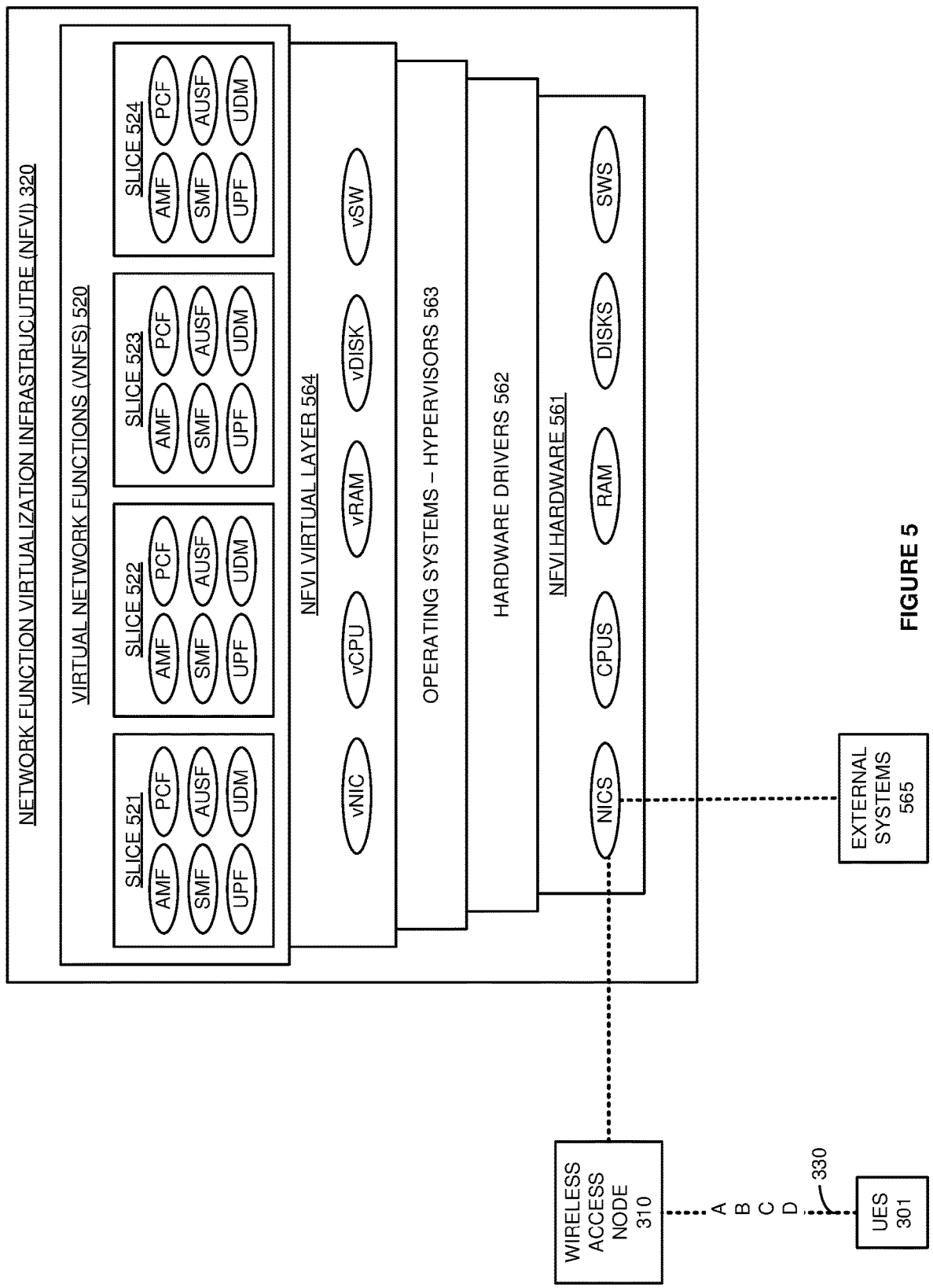
FIG. 5 illustrates a Network Function Virtualization Infrastructure (NFVI) having wireless network slices that serve the wireless UEs over the wireless access node and common radio channel.

FIG. 5 illustrates Network Function Virtualization Infrastructure (NFVI) 320 having wireless network slices 521-524 that serve wireless UEs 301 over wireless access node 310 and subchannels A, B, C, and D of radio channel 330. Wireless network slice 521 delivers service A. Wireless network slice 522 delivers service B. Wireless network slice 523 delivers service C. Wireless network slice 524 delivers service D. NFVI 320 is an example of slices 121-124 in wireless communication network 100, although slices 121-124 may differ. NFVI 320 comprises NFVI hardware 561, hardware drivers 562, operating systems and hypervisors 563, NFVI virtual layer 564, and Virtual Network Functions (VNFs) 520. NFVI hardware 561 comprises Network Interface Cards (NICs), CPUs, RAM, disk storage, and data switches (SWS). Virtual layers 564 comprise virtual NICs (vNIC), virtual CPUs (vCPU), virtual RAM (vRAM), virtual Disk Storage (vDISK), and virtual Switches (vSW). VNFs 520 comprise Access and Mobility Management Functions (AMFs), Policy Control Functions (PCFs), Session Management Functions (SMFs), Authentication and Security Functions (AUSFs), User Plane Functions (UPFs), and Unified Data Managers (UDMs) although other VNFs could be used. Slices 521-524 each comprise: an AMF, PCF, SMF, AUSF, UPF, and UDM although other VNFs and VNF combinations could be used for slices 521-524.

NFVI hardware 561 executes hardware drivers 562, operating systems 563, virtual layer 564, and VNFs 520 to serve UEs 301 with services A, B, C, and D over wireless access node 310 and subchannels A, B, C, and D in radio channel 330. The AMFs exchange N2/N1 signaling with the RRC in wireless access node 310 over the backhaul links. The UPFs exchange N3 data with the SDAP in wireless access node 310 over the backhaul links. Wireless access node 110 exchanges RRC/N1 signaling and SDAP data for services A, B, C, and D over wireless access node 310 and subchannels A, B, C, and D of radio channel 330.

Figure 6:
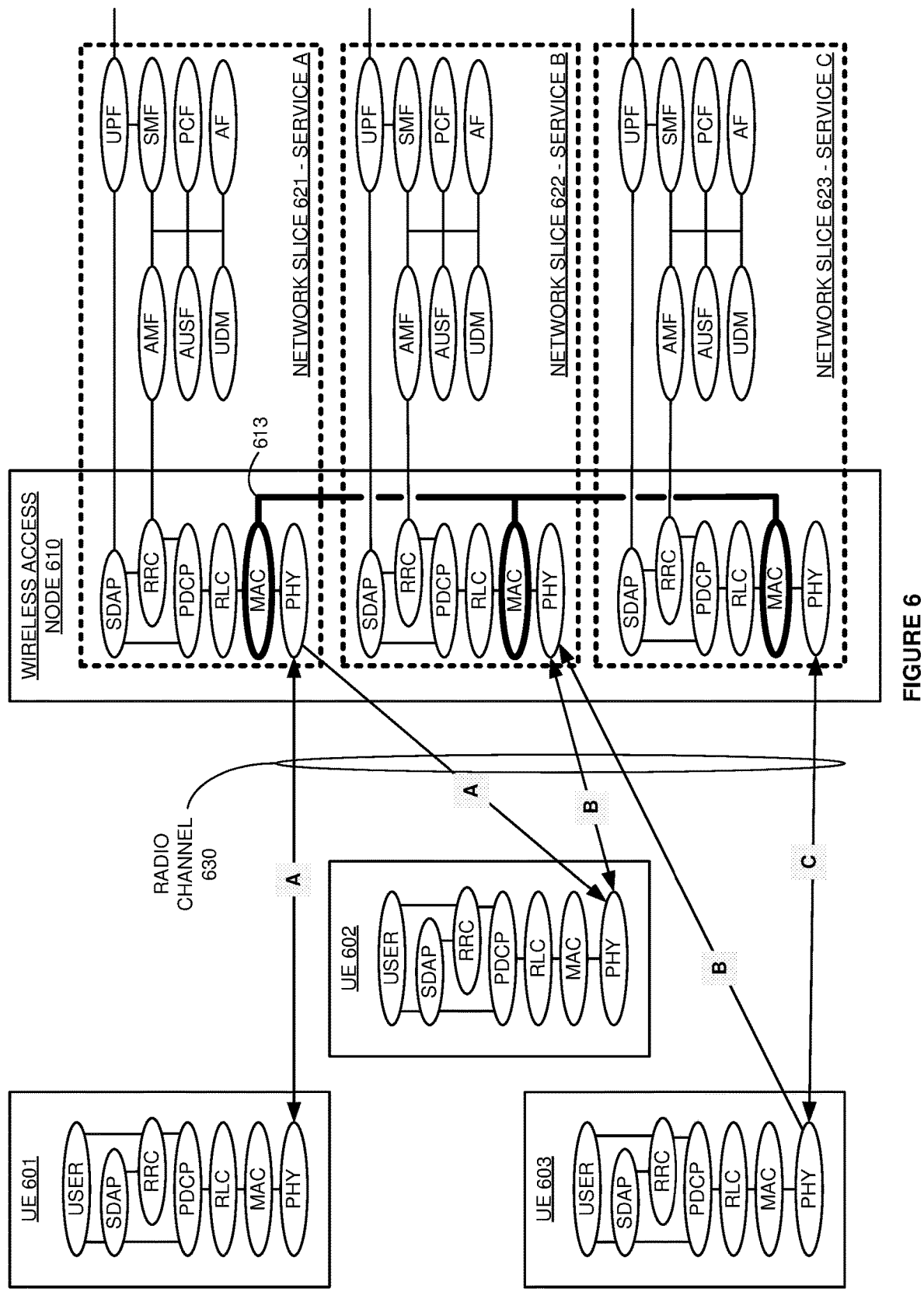
FIG. 6 illustrates the operation of wireless UEs, a wireless access node, and wireless network slices to serve the wireless UEs over a common radio channel.

FIG. 6 illustrates the operation of wireless UEs 601-603, wireless access node 610, and wireless network slices 621-623 to serve wireless UEs 601-603 over radio channel 630. Wireless access node 610 is an example of wireless access nodes 110 and 310, although access nodes 110 and 310 may differ. Network slice 621 supports network service A. Network slice 622 supports network service B. Network slice 623 supports network service C. The network services could be internet-access, machine communications, media-conferencing, social networking, or some other data communication product.

In some alternative examples, network slices 621-623 do not include the PHY, MAC, RLC, PDCP, SDAP, and RRC— or do not include a portion thereof. In these cases, the same MAC may serve network slices 621-623 as described herein by sizing subchannels A, B, and C and backfilling the subchannels across services A, B, and C. In the present example, the MACs are slice-specific, but the MACs are integrated over MAC link 613 to efficiently render backfill support to one another. In some examples, MAC link 613 comprises a virtual switch that serves MAC VNFs.

The MAC in network slice 621 determines the size and placement of a subchannel A within radio channel 630. To make the determination, the MAC translates the time (time-of-day, day-of-week, and day-of-year) into channel A size and placement. The MAC in network slice 622 determines the size and placement of a subchannel B within radio channel 630 by translating the time into the channel B size and placement. The MAC in slice 623 determines the size and placement of a subchannel C within radio channel 630 by translating the time into the channel C size and placement. The translations may use a common data structure that is configured based on historical data for service usage, usage time, and usage location to allocate radio channel 630 into subchannels A, B, and C for network slices 621-623 based on the current time.

Initially, UEs 601-603 attach to network slices in wireless access node 610 that may or may not be shown on FIG. 6. Eventually, UEs 601-603 handover to respective network slices 621-623 to receive their respective network services A, B, and C. The RRC in UE 601 and the RRC in network slice 621 exchange RRC signaling over their respective PDCPs, RLCs, MACs, and PHYs. In network slice 621, the RRC exchanges N2 signaling for UE 601 with the AMF, and the AMF exchanges N1 signaling with the RRC in UE 601 over wireless access node 610. In network slice 621, the AMF interacts with the SMF and PCF to select default bearers and QoS for UE 601. In network slice 621, the AMF and the RRC exchange N2 signaling that indicates the network-selected bearers and QoS. In network slice 621, the RRC configures its network applications to communicate with UE 601 and the UPF. In particular, the MAC in network slice 621 schedules uplink and downlink resource blocks from subchannel A in radio channel 630 for UE 601 and other UEs that receive service A.

The RRC in UE 602 and the RRC in network slice 622 exchange RRC signaling over their respective PDCPs, RLCs, MACs, and PHYs. In network slice 622, the RRC exchanges N2 signaling for UE 602 with the AMF, and the AMF exchanges N1 signaling with the RRC in UE 602 over wireless access node 610. In network slice 622, the AMF interacts with the SMF and PCF to select default bearers and QoS for UE 602. In network slice 622, the AMF and the RRC exchange N2 signaling that indicates the network-selected bearers and QoS. In slice 622, the RRC configures its network applications to communicate with UE 602 and the UPF. In particular, the MAC in network slice 622 schedules resource blocks from subchannel B in radio channel 630 for UE 602 and other UEs that receive service B.

The RRC in UE 603 and the RRC in network slice 623 exchange RRC signaling over their respective PDCPs, RLCs, MACs, and PHYs. In network slice 623, the RRC exchanges N2 signaling for UE 603 with the AMF, and the AMF exchanges N1 signaling with the RRC in UE 603 over wireless access node 610. In network slice 623, the AMF interacts with the SMF and PCF to select default bearers and QoS for UE 603. In network slice 623, the AMF and the RRC exchange N2 signaling that indicates the network-selected bearers and QoS. In slice 623, the RRC configures its network applications to communicate with UE 603 and the UPF. In particular, the MAC in network slice 623 schedules resource blocks from subchannel C in radio channel 630 for UE 603 and other UEs that receive service C.

The MACs for network slices 621-623 in wireless access node 610 exchange signaling over MAC link 613 that indicates and reserves unscheduled resource blocks. For example, the MAC in network slice 621 may inform the MACs in slices 622-623 that subchannel A has 5 unused downlink resource blocks, and the MAC for network slice 622 may reserve all 5 downlink resource blocks. The MAC in slice 621 adds the reserved downlink resource blocks to its schedule. The MAC for slice 622 transfers service B data over MAC link 613 to the MAC in slice 621 to fill the reserved resource blocks. In another example, the MAC in network slice 622 may inform the other MACs in slices 621 and 623 that subchannel B has 10 unused uplink resource blocks, and the MAC for network slice 623 may reserve all 10 uplink resource blocks. The MAC in slice 622 adds the reserved uplink resource blocks to its schedule.

The RRCs in network slices 621-623 transfer configuration information to UEs 601-603 for the bearers and QoS over the PDCP, RLC, MAC, and PHYs. The RRCs in UEs 601-603 configure their network applications to communicate with slices 621-623 per the configuration information. The MACs in network slices 621-623 transfer their schedules to the MACs in UEs 601-603 over the PHYs. The SDAPs in network slices 621-623 and the SDAPs in respective UEs 601-603 then exchange service data over the resource blocks in subchannels A, B, and C in radio channel 630 per the MAC scheduling. UE 601 and network slice 621 exchange data for service A over subchannel A in radio channel 630. UE 602 and network slice 622 exchange data for service B over subchannel B in radio channel 630. UE 603 and network slice 623 exchange data for service C over subchannel C in radio channel 630.

When subchannel A is full and subchannel B or C is not full, UE 601 and network slice 622 or 623 can exchange data for service A over subchannel B or C in radio channel 630. When subchannel B is full and subchannel A or C is not full, UE 602 and network slice 621 or 623 can exchange data for service B over subchannel A or C in radio channel 630. When subchannel C is full and subchannel A or B is not full, UE 603 and network slice 621 or 622 can exchange data for service C over subchannel A or B in radio channel 630. The MACs maintain data separation among the service and slices by using different service IDs, slice IDs, IP address, IP port, network ID, or some other slice-differentiating information present in the data.

In the above backfill examples, the MAC in network slice 621 will transfer data for service B to the MAC in UE 602 over the 5 downlink resource blocks in subchannel A of radio channel 630. The MAC in network slice 621 transfers uplink signaling for service B to the MAC in network slice 622 over MAC link 613. In addition, the MAC in UE 603 will transfer data and signaling for service C to the MAC in network slice 622 over the 10 uplink resource blocks in subchannel B of radio channel 630. The MAC in network slice 622 transfers the data and signaling for service C to the MAC in network slice 623 over MAC link 613.

The wireless data network circuitry described above comprises computer hardware and software that form special-purpose wireless network circuitry to wirelessly serve UEs over time-sized subchannels in a common radio channel. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to wirelessly serve UEs over time-sized subchannels in a common radio channel.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve wireless user devices over a radio channel that is allocated into subchannels for wireless network slices, the method comprising:
   a wireless access node scheduling resource blocks from the subchannels to the wireless user devices based on the wireless network slices used by the wireless user devices;
   the wireless access node detecting when one of the subchannels has available resource blocks and other ones of the subchannels need the available resource blocks, and in response, scheduling the available resource blocks to ones of the wireless user devices that need the available resource blocks and that use a higher priority one of the wireless network slices;
   the wireless access node wirelessly exchanging user data with the wireless user devices over the scheduled resource blocks and exchanging the user data with the wireless network slices; and
   the wireless network slices exchanging the user data with the wireless access node and exchanging at least some of the user data with external systems.

2. The method of claim 1 where the subchannels comprise an internet-access subchannel and the wireless network slices comprise an internet-access slice that uses the internet-access subchannel.

3. The method of claim 1 where the subchannels comprise a Low-Power Wide Area Network (LP-WAN) subchannel and the wireless network slices comprise an LP-WAN slice that uses the LP-WAN subchannel.

4. The method of claim 1 where the subchannels comprise a Vehicle-to-X (V2X) subchannel and the wireless network slices comprise a V2X slice that uses the V2X subchannel.

5. The method of claim 1 where the subchannels comprise a media-conferencing subchannel and the wireless network slices comprise a media-conferencing slice that uses the media-conferencing subchannel.

6. The method of claim 1 wherein the wireless access node scheduling the resource blocks, detecting when the one of the subchannels has the available resource blocks and the other ones of the subchannels need the available resource blocks, and scheduling the available resource blocks comprises at least one Media Access Control (MAC) scheduling the resource blocks, detecting when the one of the subchannels has the available resource blocks and the other ones of the subchannels need the available resource blocks, and scheduling the available resource blocks.

7. The method of claim 1 wherein the wireless access node scheduling the resource blocks, detecting when the one of the subchannels has the available resource blocks and the other ones of the subchannels need the available resource blocks, and scheduling the available resource blocks comprises individual Media Access Controls (MACs) that serve individual ones of the wireless network slices scheduling the resource blocks, detecting when the one of the subchannels has the available resource blocks and the other ones of the subchannels need the available resource blocks, and scheduling the available resource blocks.

8. The method of claim 1 wherein the wireless network slices comprise User Plane Functions (UPFs).

9. The method of claim 1 further comprising the wireless access node sizing the subchannels for the wireless network slices based on time-of-day.

10. The method of claim 1 further comprising the wireless access node sizing the subchannels for the wireless network slices based on geographic location.

11. A wireless communication network to serve wireless user devices over a radio channel that is allocated into subchannels for wireless network slices, the wireless communication network comprising:
    a wireless access node configured to schedule resource blocks from the subchannels to the wireless user devices based on the wireless network slices used by the wireless user devices;
    the wireless access node configured to detect when one of the subchannels has available resource blocks and other ones of the subchannels need the available resource blocks, and in response, to schedule the available resource blocks to ones of the wireless user devices that need the available resource blocks and that use a higher priority one of the wireless network slices;
    the wireless access node configured to wirelessly exchange user data with the wireless user devices over the scheduled resource blocks and exchange the user data with the wireless network slices; and
    the wireless network slices configured to exchange the user data with the wireless access node and exchange at least some of the user data with external systems.

12. The wireless communication network of claim 11 where the subchannels comprise an internet-access subchannel and the wireless network slices comprise an internet-access slice that uses the internet-access subchannel.

13. The wireless communication network of claim 11 where the subchannels comprise a Low-Power Wide Area Network (LP-WAN) subchannel and the wireless network slices comprise an LP-WAN slice that uses the LP-WAN subchannel.

14. The wireless communication network of claim 11 where the subchannels comprise a Vehicle-to-X (V2X) subchannel and the wireless network slices comprise a V2X slice that uses the V2X subchannel.

15. The wireless communication network of claim 11 where the subchannels comprise a media-conferencing subchannel and the wireless network slices comprise a media-conferencing slice that uses the media-conferencing subchannel.

16. The wireless communication network of claim 11 wherein the wireless access node comprises at least one Media Access Control (MAC) configured to schedule the resource blocks, detect when the one of the subchannels has the available resource blocks and the other ones of the subchannels need the available resource blocks, and schedule the available resource blocks.

17. The wireless communication network of claim 11 wherein the wireless access node comprises individual Media Access Controls (MACs) that serve individual ones of the wireless network slices and that are configured to schedule the resource blocks, detect when the one of the subchannels has the available resource blocks and the other ones of the subchannels need the available resource blocks, and schedule the available resource blocks.

18. The wireless communication network of claim 11 wherein the wireless network slices comprise User Plane Functions (UPFs).

19. The wireless communication network of claim 11 further comprising the wireless access node sizing the subchannels for the wireless network slices based on time-of-day.

20. The wireless communication network of claim 11 further comprising the wireless access node sizing the subchannels for the wireless network slices based on geographic location.

* * * * *